Jan. 12, 1926.
H. E. COWDREY
1,569,357
WOODWORKING MACHINE
Filed Nov. 3, 1924     3 Sheets-Sheet 3
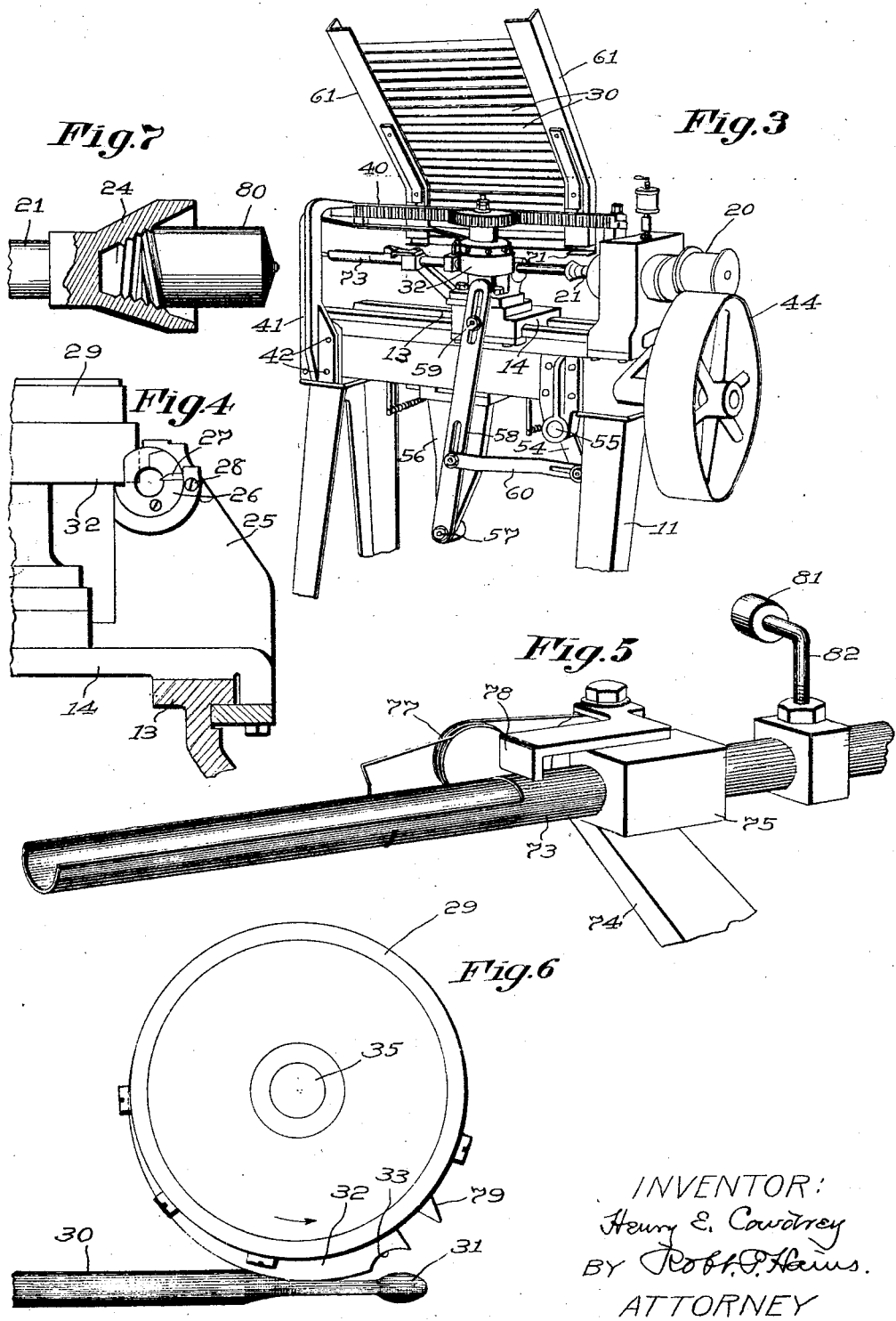
INVENTOR:
Henry E. Cowdrey
BY Robt. P. Harris.
ATTORNEY Patented Jan. 12, 1926.

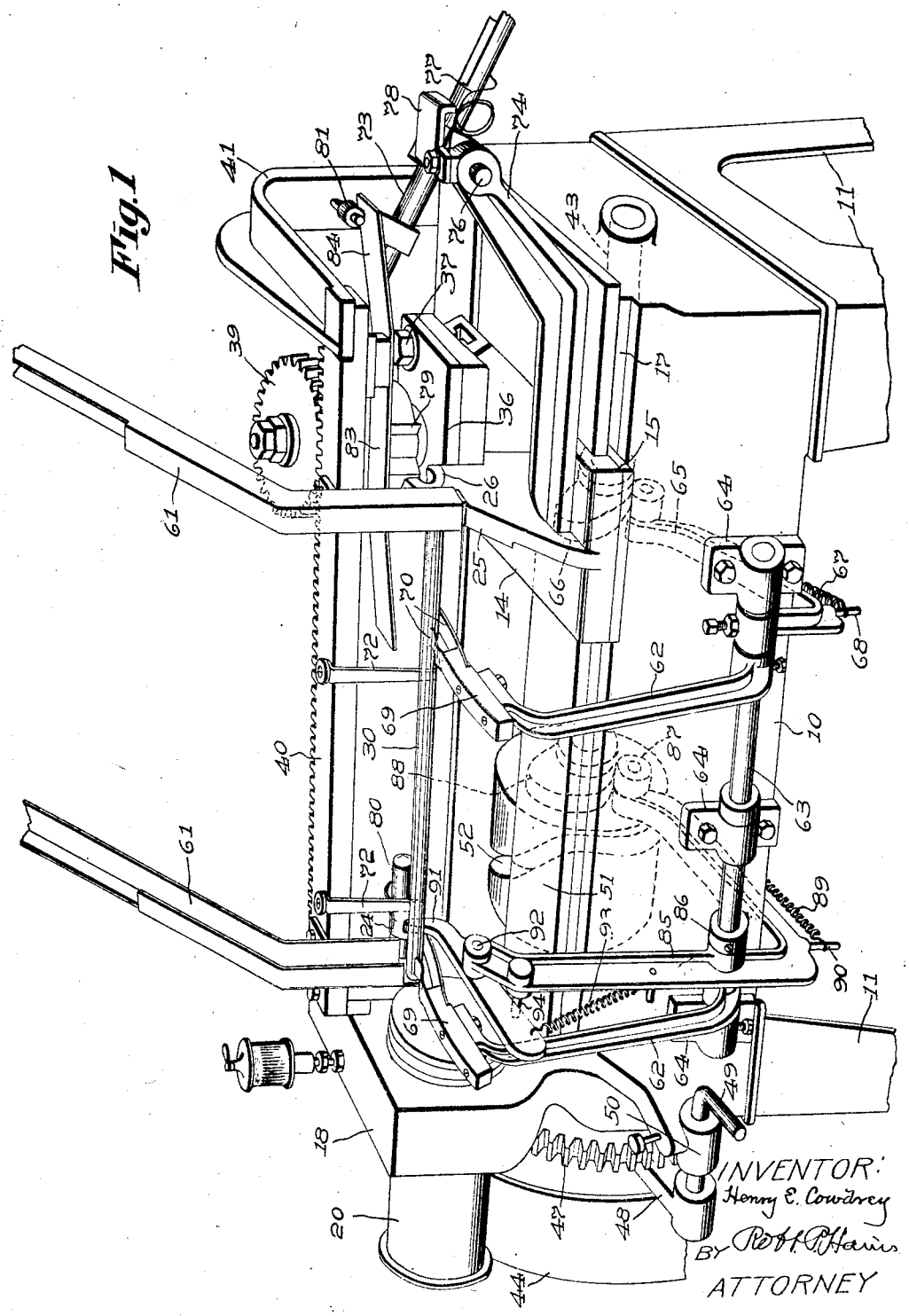

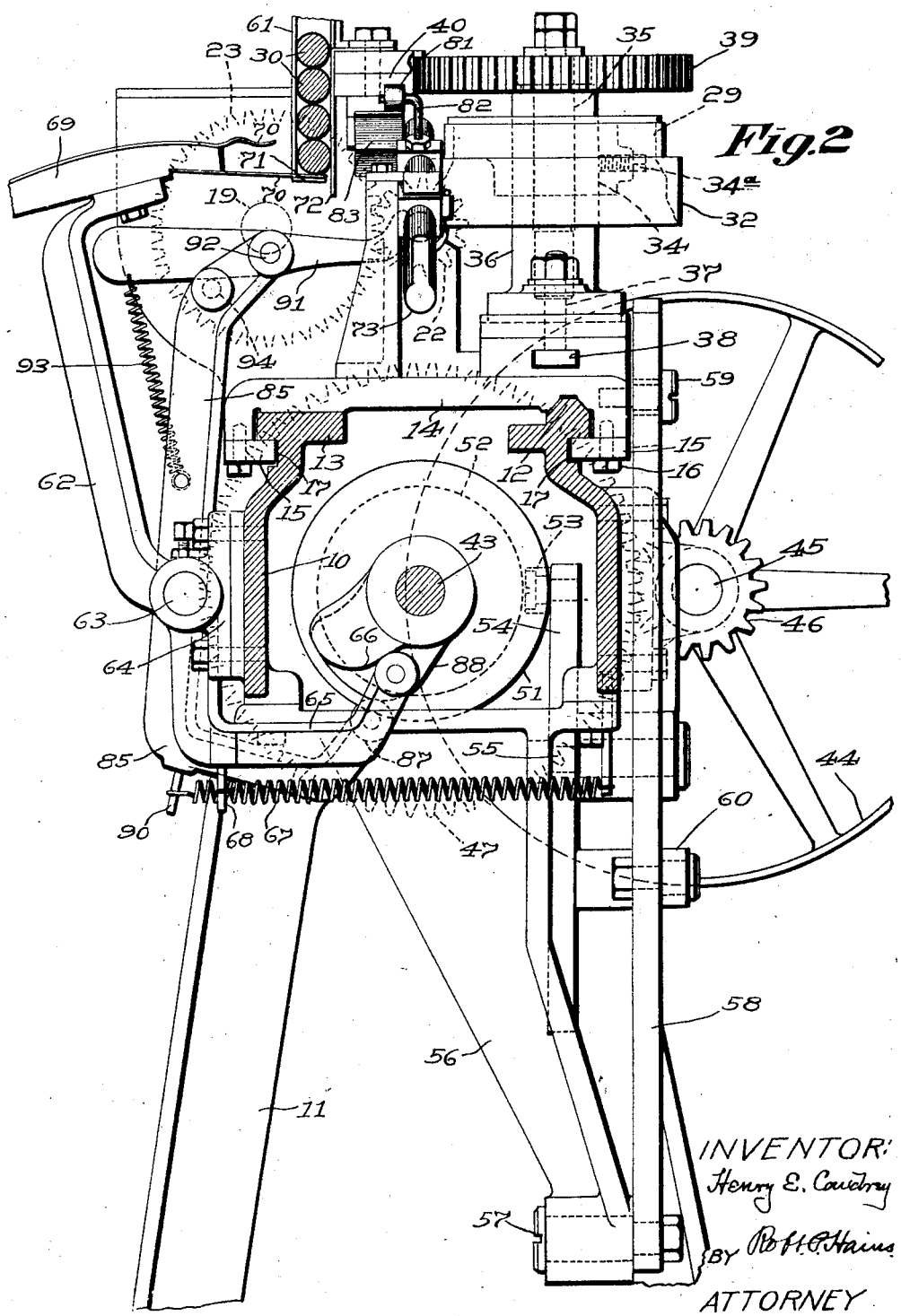

1,569,357

UNITED STATES PATENT OFFICE.

HENRY E. COWDREY, OF FITCHBURG, MASSACHUSETTS.

WOODWORKING MACHINE.

Application filed November 3, 1924. Serial No. 747,441.

*To all whom it may concern:*

Be it known that I, HENRY E. COWDREY, a citizen of the United States, and resident of Fitchburg, county of Worcester, and State of Massachusetts, have invented an Improvement in Woodworking Machines, of which the following description, in connection with the accompanying drawings, is a specification, like characters on the drawings representing like parts.

This invention relates to a wood working machine of the lathe type, and more particularly to a machine of this type in which all of the operations, including the presenting of the work to the driving means and the removal of the finished work from the machine, are performed automatically.

While some of the features of the present invention may be employed in various types of machines, they are designed more particularly for use upon a well known type of wood working machine employing a cylinder like cutter that rolls lengthwise of the rotating work to vary the diameter of the work.

Heretofore in wood working machines of the well known type just mentioned, it has been necessary for an operative to present the work manually to the driving spindle and to perform other operations upon each piece of work such as removing each finished piece from the rotating position if the work is relatively long. As a result the output of an operative has been limited by the capacity of a single machine. The present invention is directed to means for performing all operations automatically so that one operative may run a number of machines at the same time.

Said hand operated machines are commonly provided with a driving spindle having a work receiving socket into which the end of a piece of work is inserted by hand to be rotated thereby. A cutting tool is then advanced along the work to give the same the desired configuration, and as soon as the work is reduced to the required diameter it is cut off near the driving socket, thus leaving a short stub in the socket that has to be removed before the next piece of work can be inserted.

These operations are now performed automatically in accordance with the present invention, and one important feature of the invention resides in a supply hopper mounted upon the machine and having cooperating means for presenting the lowest piece of work in the hopper to the driving spindle so that it is firmly engaged and driven by the spindle.

Another important feature of this invention resides in a traveling carrier or sleeve that follows the cutting tool to support the work both before and after it is relieved from the driving means, and is actuated to carry the finished work away from the cutting position and then discharge it.

Another important feature of the invention resides in a striker which operates automatically to strike the stub left in the socket after the work has been cut off and knock the stub out of the socket so that the next piece of work may be inserted in the driving socket.

Other features of the invention and novel combination of parts, in addition to the above, will be hereinafter described in connection with the accompanying drawings, which illustrate one good practical form thereof.

In the drawings—

Fig. 1 is a front perspective view of a wood working machine embodying the features of the present invention.

Fig. 2 on an enlarged scale is an end view of Fig. 1 looking toward the left and parts of the machine are broken away to disclose parts that are normally hidden.

Fig. 3 on a reduced scale is a rear perspective view of the machine of Fig. 1.

Fig. 4 is an end view showing a portion of the traveling carriage.

Fig. 5 is a perspective view of a work-supporting sleeve or carrier.

Fig. 6 is a top plan view of the cylinder-like cutter shown in engagement with the work; and Fig. 7 is a sectional view thru the work-receiving socket showing a stub mounted therein.

The machine of the present invention is shown as having the supporting frame or bed 10 which is supported by the legs 11. The upper face of the frame or bed 10 is provided with the runways 12 and 13, along which the carriage 14 slides, and the carriage is held in place upon its runways by the projecting plates 15 secured to the carriage by bolts 16 and which plates project into recesses 17 formed below the runways 12 and 13.

At one end of the frame 10 is mounted the hollow head 18 in which is journaled the shaft 19, and this shaft is driven by the belt pulley 20. Wood working machines are usually operated at high speed and in the present case the work supporting shaft 21 is mounted in the head 18 at one side of the shaft 19 and the shaft 21 is provided with a pinion 22 which meshes with and is driven at high speed by the gear 23, secured to the shaft 19 within the hollow head 18. The shaft 21 may be provided with variously constructed work engaging means and in the present case has a head 24 in which is formed a tapered socket, and this socket is provided with coarse spiral threads which bite into the work and grip it firmly to drive the same.

The traveling carriage 14 is provided with means for rotatably supporting the opposite end of the work and to this end the carriage has an upstanding portion 25 in which is mounted the ring 26, the bore of which is of a size to snugly receive the work as the latter is reduced in diameter by the roughing tool 27. This tool is adjustably secured to the upstanding portion 25 adjacent the ring 26 by a clamping bolt 28. The roughing tool 27 serves to turn the work to a uniform diameter and, in order to vary the diameter of the work in accordance with a predetermined design the finishing tool 29 is provided. This tool comprises a cylinder-like head which is rotatably supported by the carriage so that the cutter rotates about a vertical axis as the carriage 14 travels along the work and the rotation of the cutter serves to bring the varying contour of the cutter into cutting engagement with the work. In the present case the cutter head 29 is shown in Fig. 6 as reducing the diameter of a blank 30 to form a drum stick having the usual tapered end portion with a rounded head 31 at its reduced end. In order to give the blank 30 the desired configuration the cutter head 29 has the arc-shaped cutter 32, the active face of which has a reduced or notched portion 33 which serves to form the rounded head 31 of the drum stick and the cutting face of the cutter 32 gradually recedes from the axis of the work, as will be apparent from Fig. 6, to give the drum stick the desired taper as the cutter head rotates along the same. The cutter head 29 is secured to a hollow stub shaft or sleeve 34, by means of a set screw 34$^a$ and this sleeve is rotatably mounted upon the upright spindle 35 which spindle is rigidly secured in the base post 36. It may be desirable to secure the cutting head 29 in different positions upon the carriage 14 and to this end the post 36 may be adjusted lengthwise of the carriage and secured rigidly in different positions thereupon by the clamping bolt 37, the head of which is received in a slot 38. A gear 39 is rigidly secured to the stub shaft or sleeve 34 and the teeth of this gear mesh with the teeth of the rack 40. This rack extends longitudinally of the machine and one end thereof may be rigidly secured to the head 18, while the opposite end of the rack is supported by the bracket 41 secured to the rear face of the supporting frame by bolts 42. The arrangement is such that as the carriage is moved along its runway towards the head of the machine the gear 39 is rotated by the fixed rack 40 to bring different portions of the cutter 32 into cutting engagement with the work. The ring 26 lies opposite the active portion of the cutter 32 to support the work adjacent the cutter and the ring is partly cut away to clear the cutter as will be apparent from Fig. 1.

Means is provided for moving the carriage 14 towards and from the work, and to this end, in the construction shown, movement is imparted to the carriage from a cam shaft 43 which extends lengthwise of the lathe and the opposite ends of which are rotatably supported by the lathe bed. This shaft is driven from a large belt pulley 44 mounted upon the shaft 45, having the pinion 46 which meshes with and drives the large gear 47 rigidly secured to the cam shaft 43. A clutch having any preferred construction is provided between the pulley 44 and pinion 46, so that rotation of the latter may be started and stopped without stopping the driving pulley. The clutch may be shifted by a laterally extending arm 48 operated by a handle 49, the shank portion of which slides in the fixed bracket 50. The cam shaft 43 is provided with a cam drum 51 having the curved slot 52 adapted to receive a roller 53 secured to the upper end of the rocking lever 54, which lever is pivotally mounted at 55. (See Fig. 3.) The supporting frame 10 is provided with a rigid, downwardly extending bracket 56 to which is pivoted at 57 the lower end of the rocking lever 58 and the upper end of this lever is operatively connected to the slide 14 by a bolt 59 which extends thru an elongated slot in the upper end of the lever and is secured to the slide 14. Rocking movement is imparted from the cam actuated lever 54 to the lever 58 by the link 60. The arrangement is such that as the cam shaft 43 is slowly rotated by the driving means described, the carriage will be moved the desired distance towards the head of the machine and then away from the same to its inoperative position during one complete rotation of the shaft 43, and the length of travel imparted to the carriage may be varied by varying the position at which the ends of the link 60 are secured to the levers 54 and 58. As stated, means is provided for automatically supplying the work or blanks to the machine and to this end a hopper is provided which, in the present instance, consists of spaced upwardly extending trough-shaped elements 61 which may be rigidly secured to and supported by the rack 40. The upper portion of the hopper is preferably inclined to the vertical, while the lower portion is disposed in a vertical plane, as will be apparent from the drawings, and the lower ends of the trough-shaped elements 61 are disposed at one side of the axis of the driving spindle 21, as clearly shown in Fig. 2.

Means is provided for transferring the piece of work or blank at the bottom of the hopper to a position in axial alignment with the work driving shaft 21, whereupon the work is forced in the direction of its length into the tapered socket 24, so that the coarse spiral threads therein will bite into the blank and rotate the same. In the construction shown the work is transferred from the hopper to the driving spindle by rocking arms 62 supported by a longitudinally extending shaft 63 rotatably mounted in brackets 64 secured to the front face of the supporting frame 10. The rocking arms 62 are rigidly secured to the shaft 63 and rocking movement is imparted to this shaft by a transversely extending arm 65 having a roller at its inner end which rests against and is actuated by a cam 66 secured to the operating shaft 43. The roller at the inner end of the arm 65 is forced against its actuating cam by a spring 67, one end of which is secured to a pin 68 extending downwardly from a vertically disposed portion of the arm 65 and the opposite end of which spring is anchored to the frame 10. At the upper end of each rocking arm 62 is provided a blank engaging block 69 provided with spaced resilient fingers 70. The arrangement is such that the parts normally occupy the position shown in Fig. 1, but as the cam 66 moves into engagement with the roller at the end of the shaft 65 the gripping fingers 70 move rearwardly to engage the blank at the lower end of the hopper and move the blank into axial alignment with the driving shaft 21, and while the blank is held in its position by the resilient fingers 70, the carriage 14 is advanced so that the ring 26 strikes the opposite end of the blank and forces the blank into the socket 24, whereupon the blank is immediately rotated and its opposite end is reduced by the roughing cutter 27 so that this end will enter the ring 26 and be supported thereby. As soon as the blank is supported at one end by the socket 24 and at its other end by the ring 26, the rocking arms 62 are moved by the spring 67 in the opposite direction to disengage the resilient fingers from the blank. It should be noted that the supporting blocks 69 are of substantial length; this construction is desirable so that the upper face of these blocks will prevent the next blank from dropping to the lowermost position until the releasing fingers 70 have returned to their normal position, shown in Fig. 2, whereupon the blank may move downwardly in its hopper and be supported by the lip 71 at the bottom of the hopper. Resilient stops 72 secured to and extending downwardly from the rack 40 are provided to hold the blank in the hopper while the resilient fingers 70 are being forced into engagement with the blank, whereupon these stops will yield to permit the blank to move towards the driving shaft.

In an automatic machine such as herein described it is desirable to provide means for supporting the work when the turning operation upon the same has been completed and to convey the work away from the turning position. To this end, in the present case, a sleeve or carrier 73 is provided which is pivotally mounted upon an arm 74 secured to and extending upwardly from the carriage 14. The sleeve 73 is shown as comprising a relatively long tube the inner bore of which is sufficiently large to permit the finished article such as the drum stick 30 to pass thru the same. This sleeve is mounted in a block 75 pivotally secured by the pin 76 to the supporting arm 74. The arrangement is such that the sleeve may be tilted to the inclined position shown in Fig. 1 to cause the work to slide out of the same, but the sleeve is normally held in a horizontal position by the spring 77 which rocks its outer end upwardly until the same strikes the stop 78.

As the slide 14 is advanced towards the head of the machine by the mechanism described, the cutters 27 and 32 act upon the work to give the same the desired configuration and after the turning operation is completed a cutting spur 79 upon the cutter head 29 severs the finished portion of the blank at a point adjacent the driving head 24 to leave therein the short stub 80. Before this occurs, however, the sleeve 73 is inserted over the work 30 to steady the same while it rotates and to support it when it is severed from the stub 80. As the carriage 14 recedes from the head with the finished work within the sleeve 73 a roller 81 secured to the sleeve by an upwardly extending arm 82 passes over the downwardly inclined inner end of a blade 83 and as the carriage continues to move rearwardly the roller 81 travels along the outer upwardly bent end 84 of the blade which serves to tilt the sleeve, as shown in Fig. 1, to cause the work to slide out of the sleeve, and as soon as the roller 81 clears the rear end of this blade, the sleeve is rocked to its horizontal position by the spring 77, ready to receive the next piece of work.

Before the next blank can be inserted in the sockets 24 the stub 80 must be removed, and in accordance with the present invention means is provided for automatically knocking this stub out of the socket. To this end an L-shaped arm 85 is rockingly mounted upon the shaft 63 and may be held in place thereupon by a fixed sleeve 86. One end of the L-shaped arm 85 is provided with a roller 87 which is actuated by a cam 88 secured to the cam shaft 43 and the roller is normally urged towards its cam by a spring 89, one end of which is secured to a pin 90 extending downwardly from the L-shaped arm, and the opposite end of the spring is secured to the machine frame. The upper end of the arm 85 is provided with a striker 91 pivotally secured to the lever at 92. The object in pivotally mounting the striker upon the arm 85 is to permit the stub engaging end of this striker to be rocked downwardly so that it may pass under a rotating blank as the striker moves frontwardly to its inoperative position. A spring 93 secured to the front end of the striker normally pulls this end downwardly to rest on the stud 94, but will yield to permit the active end of the striker to rock downwardly as the same moves under the rotating blank.

The cam 66 is so constructed that it will hold the resilient fingers 70 in supporting engagement with the blank until after the same has been engaged at each end by the supporting means described, and the cam 88 is so constructed that it will hold the striker 91 in a rearward position in which the upturned end of the striker lies to the far side of the work until after the work has started to rotate, and will then permit the striker to move frontwardly to approximately the position shown in Fig. 1.

From the foregoing description when read in connection with the drawings, it will be seen that the various operations above described are performed automatically so that one blank after another is taken from the hopper, presented to the driving shaft and then rotated while subjected to the action of the cutters, and, when reduced to the desired diameter, is cut off and carried away from the cutting position by the supporting sleeve, to be discharged by the sleeve at one end of the lathe. The use of the sleeve 73 is particularly desirable when the machine is operating upon relatively long work because when long sticks or pieces of work are turned rapidly in a lathe, they tend to move out of their axial position and flop around to a pronounced degree. Thru the present construction, whereby the sleeve 73 travels with the finishing cutter and is inserted over the finished portion of the work, the projecting finished end of the work rotates in the sleeve and is prevented thereby from vibrating and flopping around under its rapid rotation, and the work is also prevented from flying out of the machine when it is severed from the stub 80.

What is claimed is:—

1. A wood working machine, comprising in combination, work supporting and rotating means, a cutter, means for advancing the cutter along the work, a pivotally mounted carrier supported to travel with the cutter and to engage the completed portion of the rotating work to support the work upon completion of the cutting operation, and means for tilting the carrier to eject the work from the carrier.

2. A wood working machine, comprising in combination, means for supporting and rotating the work, a carriage, means for supporting the carriage and for advancing it lengthwise of the work, a cutter advanced along the work by the carriage and having a work support opposite the cutter for holding the rotating work against the cutter, and a tiltable work receiving sleeve separate from and supported in spaced relation to said work support to travel with the carriage and mounted in position to be inserted over the completed portion of the work as the tool advances along an unfinished portion of the work to steady the rotating work and to entirely support the work when finished and released from the rotating means.

3. A wood working machine, comprising in combination, means for supporting and rotating the work, a carriage, means for advancing the carriage lengthwise of the work, a cutter advanced along the work by the carriage, a work receiving sleeve pivotally supported by the carriage in position to be inserted over the completed portion of the work as the tool advances to support the work upon completion of the cutting operation, and means for tilting the sleeve to cause the work to slide through the same.

4. A wood working machine, comprising in combination, means for supporting and rotating the work, a carriage, means for advancing the carriage lengthwise of the work, a cutter advanced along the work by the carriage, a work receiving sleeve pivotally supported by the carriage, means for rocking the sleeve into position to be inserted over the completed portion of the work to support the work upon completion of the cutting operation, and means for tilting the sleeve to eject the work as the carriage moves away from the cutting position.

5. A wood working machine, comprising in combination, means for supporting and rotating a relatively long stick, a carriage, means for advancing the carriage lengthwise of the work, a cutter advanced along the work by the carriage and having a work support opposite the cutter for holding the work against the cutter, a work receiving sleeve supported for movement relatively to the work support and adapted to be inserted over the work to steady it as the tool advances along the work and to support the work when the cutting operation is completed and to remove the work from the cutting position.

6. A wood working machine, comprising in combination, means for supporting and rotating the work, a carriage, means for advancing the carriage lengthwise of the work, a cutter that is advanced relative to the work, a long work carrier pivotally supported by the carriage in position to engage and support the work both during the cutting operation and after the work is disengaged from the rotating means, means for yieldingly holding the carrier in a horizontal position, and means for engaging and tilting the carrier to eject the work as it completes its movement away from the cutting position.

7. A wood working machine, comprising in combination, means for supporting and rotating the work, a carriage, means for supporting the carriage and for advancing it lengthwise of the work, a cutter advanced along the work by the carriage and having a work support opposite the cutter for holding the rotating work against the cutter, a relatively long work carrier mounted upon the carriage at the rear of said work support and positioned to be advanced along the work to steady it as the tool travels along the work and to support the work when the cutting operation is completed and to move relatively to said work support to remove the work from the cutting position.

8. A wood working machine, comprising in combination, means for supporting and rotating the work, a carriage having a supporting bed, means for advancing the carriage along its bed lengthwise of the work, a cutter that is advanced relatively to the work, a work carrier that is supported by the carriage to travel along said bed in axial alignment with the work and movable by the carriage into position to engage and support the work both during the cutting operation and after the work is disengaged from the rotating means, and means supported in position to engage the carrier as the latter moves away from the cutting position and adapted to tilt the carrier to eject the work therefrom.

9. A wood working machine, comprising in combination, a supporting frame having a driving head provided with work holding means, a carriage provided with means for advancing it along the frame, a work supply hopper for supporting long sticks one above the other, rocking arms spaced from each other lengthwise of the machine and operable to transfer a long stick in a lateral direction from the hopper to its position of rotation, a pair of work engaging fingers upon each arm constructed to yieldingly engage a stick near its opposite ends and to hold the stick between the fingers until after it has started rotating, means upon the carriage and movable thereby against the stick held by the fingers to force the stick axially into engagement with the driving head to be driven thereby, a cutter advanced by the carriage to act upon the work, and power means for automatically operating the rocking arms and carriage in timed relation.

10. A wood working machine, comprising in combination, a supporting frame having a driving head provided with work holding means, a carriage having means for advancing it along the frame, a work supply hopper for supporting sticks, rocking arms spaced from each other lengthwise of the machine and operable to transfer a stick laterally from the hopper to its position of rotation, a pair of work engaging fingers upon each arm constructed to yieldingly engage a stick near its opposite ends and to hold the stick between the fingers until after it has started rotating, a work supporting ring upon the carriage and movable by the carriage against the stick held by the fingers to force the stick axially into engagement with the driving head to be driven thereby, a cutter advanced by the carriage to act upon the work, and a carrier adapted to support the finished portion of the stick as it is acted upon by the cutter and passes thru said ring.

11. A wood working machine, comprising in combination, a supporting frame, a driving shaft supported by the frame and having a work engaging element constructed to bite into and rotate the work, a work supply hopper, means for moving the work into axial alignment with said element, means for forcing the work in the direction of its length against said element to be driven thereby, a cutting tool for the work and operable to cut the work off adjacent said element, and an automatically operated striker adapted to strike the stub a lateral blow and knock it out of engagement with said element.

12. A wood working machine, comprising in combination, a supporting frame, a driving shaft supported by the frame and having a work receiving element constructed to bite into and rotate the work, a work supply hopper, means for delivering the work from the hopper to said element, a traveling carriage for moving a cutter lengthwise of the work, a cutter operable upon the work to cut it off adjacent said element, a carrier mounted upon the carriage to travel therewith and adapted to support the work both before and after it is cut off and operable to carry the work from the cutting position, means for tilting the carrier to discharge the work therefrom, and a striker for removing the stub from said element.

13. A wood working machine, comprising in combination, a supporting frame, a driving shaft supported by the frame and having a tapered work-receiving socket for one end of the work, a work supply hopper, means for conveying work from the hopper and for placing the work in axial alignment with the socket, a traveling carriage having a support for the opposite end of the work and adapted to force the work into said socket to cause the latter to rotate the work, a tool operable upon the work, and a carrier that travels with the carriage to receive the work when finished and movable relatively to the carriage to discharge the work.

14. A wood working machine, comprising in combination, a supporting frame having a driving head provided with work holding means, a carriage provided with means for advancing it along the frame, a work supply hopper for supporting sticks, a pair of arms spaced from each other lengthwise of the machine and operable to transfer a stick laterally from the hopper to its position of rotation, a pair of work engaging fingers upon each arm constructed to yieldingly engage the opposite sides of a stick near its ends and to support the stick for rotation between the fingers during its initial rotative movement, means upon the carriage and movable thereby against the stick held by the fingers to force it axially into engagement with the driving head, and a cutter upon the carriage to act upon the stick.

In testimony whereof, I have signed my name to this specification.

HENRY E. COWDREY.